INVENTOR.
Donald K. Isbell
BY
HIS ATTORNEY

INVENTOR.
Donald K. Isbell
BY
HIS ATTORNEY

Feb. 7, 1961

D. K. ISBELL 2,970,673

COMBINATION TOOL AND FITTING FOR BLEEDING
A BRAKE AND ADJUSTING A WHEEL BEARING

Filed Feb. 12, 1958

INVENTOR.
Donald K. Isbell
BY
HIS ATTORNEY

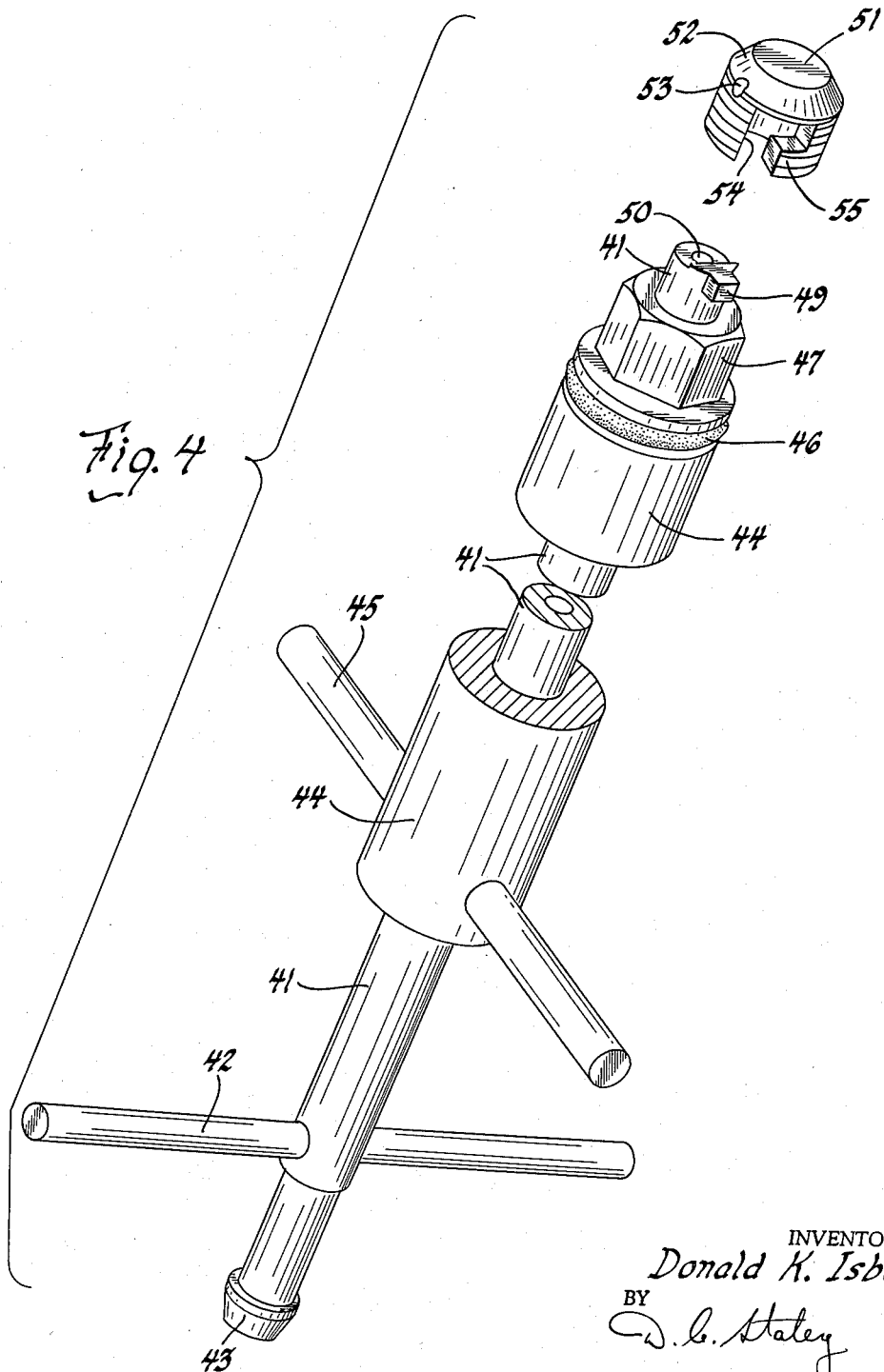

United States Patent Office 2,970,673
Patented Feb. 7, 1961

2,970,673

COMBINATION TOOL AND FITTING FOR BLEEDING A BRAKE AND ADJUSTING A WHEEL BEARING

Donald K. Isbell, Pontiac, Mich., assignor to General Motors Corporation, Detroit, Mich., a corporation of Delaware Filed Feb. 12, 1958, Ser. No. 714,776

9 Claims. (Cl. 188—18)

This invention relates to a multiple-disk hydraulic vehicle brake, and more specifically to a tool for bleeding a hydraulic wheel cylinder and adjusting the wheel bearing.

Where hydraulic brakes are employed, it becomes necessary from time to time to bleed off impurities in the fluid such as air to provide a more satisfactory operation of the brakes. As the hydraulic fluid is drained from the wheel cylinder, it is desirable to control the flow of the fluid to some container to avoid the loss of oil as well as providing clean working conditions. At the time the brake cylinders are bled, it may also be desirable to check the wheel bearings. A combination tool for adjustment of the bearings as well as bleeding of the hydraulic wheel cylinder would be useful.

It is an object of this invention to provide such a combination tool for bleeding the hydraulic brake cylinder of the wheels, as well as making the necessary adjustment of the wheel bearings.

It is another object to provide a tool whereby the bleed screw may be loosened and the fluid from the wheel cylinder may be controlled by means of a valve within the tool and fitting.

It is a further object of this invention to provide drainage means and thereby avoid any loss of oil in the area where the operator is working.

It is a further object of this invention to provide an adjusting means for the wheel bearings.

These objects are accomplished by placing a sleeve in the brake housing. This sleeve is provided with a seal about its outer periphery to avoid any external leakage of fluid from the brakes or bearings. The sleeve is mounted so that it is slidable within the brake housing. A bleed screw is mounted in the brake assembly at a point radially from the center line of the main wheel shaft. A brake-adjusting member is also provided radially the same distance from the main wheel shaft. A special tool is provided which may be inserted in this slidable sleeve of the brake housing. This tool is adapted to operate a valve within the sleeve and also to move the sleeve axially inward to engage either the brake-adjusting member or the bleed screw. The bleed screw and the brake-adjusting member being on the same radial circle, it is only necessary to rotate the brake housing in selecting either member for an adjustment. The tool is inserted in the sliding sleeve pressing inwardly to engage the bleed screw. As the bleed screw is loosened, the fluid from within the brake cylinder is allowed to bleed into the sleeve portion. Upon rotation of the valve member within the sleeve, the fluid is further allowed to drain into the combination tool and then outwardly through a hose into a container. Upon completion of the bleeding of the cylinder, the valve within the sleeve is rotated and then closed. The bleed screw is then rotated and the valve portion closed against its seat within the brake member. The sleeve is then retracted and the combination tool is withdrawn from the sleeve.

When an adjustment is desired of the wheel bearing such as a tapered roller bearing as shown, the combination tool again is inserted into the sleeve. The sleeve is then moved axially inward until the inner portion of the sleeve engages the co-operating portion of the brake adjusting member. The brake adjusting member may then be rotated to give the proper bearing adjustment. Upon completion of the adjustment of the bearing, the combination tool is then moved axially outward and withdrawn from the sleeve in the brake housing.

Further objects and advantages of the present invention will be apparent from the following description, reference being had to the accompanying drawings wherein preferred embodiments of the present invention are clearly shown.

Fig. 4 is a three-dimension view of the combination tool, and the valve member which is carried within the slidable sleeve which is mounted in the brake housing. Only the valve is shown and the other parts of the sliding sleeve are not shown. A portion of the combination tool is cut away to clarify the relation of the parts in the tool.

Figure 5:
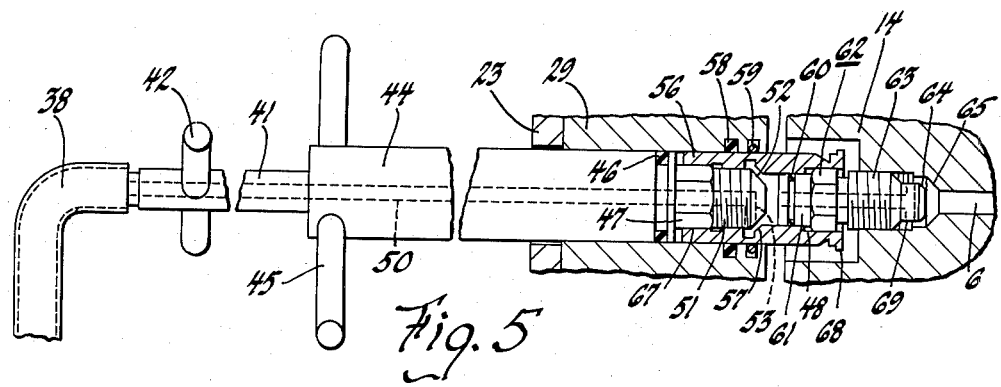

Fig. 5 is a cross-section view of the combination tool inserted into the slidable sleeve. The bleed screw is in an open position and the valve within the slidable sleeve is also in an open position.

Figure 6:
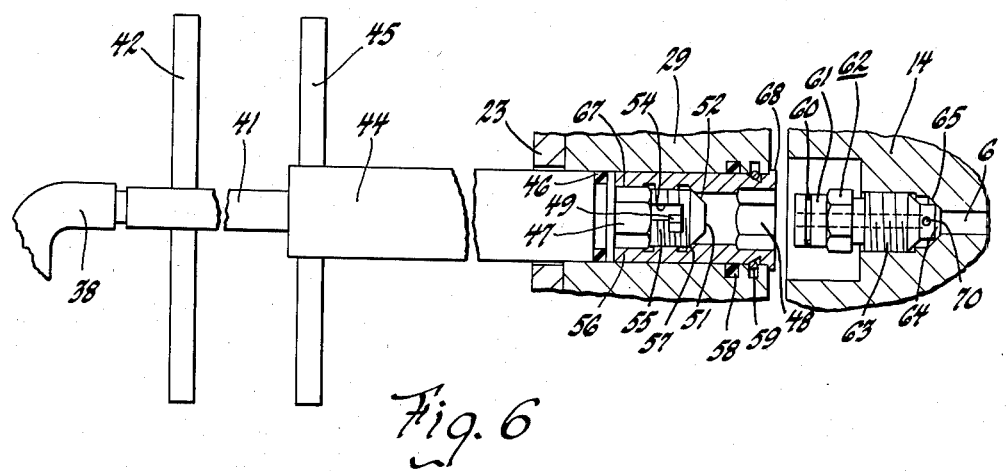

Fig. 6 is a cross-section view disclosing the combination tool inserted in the slidable sleeve and with the slidable sleeve in its outer position. The bleed screw is in a closed position and the valve member within the slidable sleeve is also in a closed position.

Figure 1:
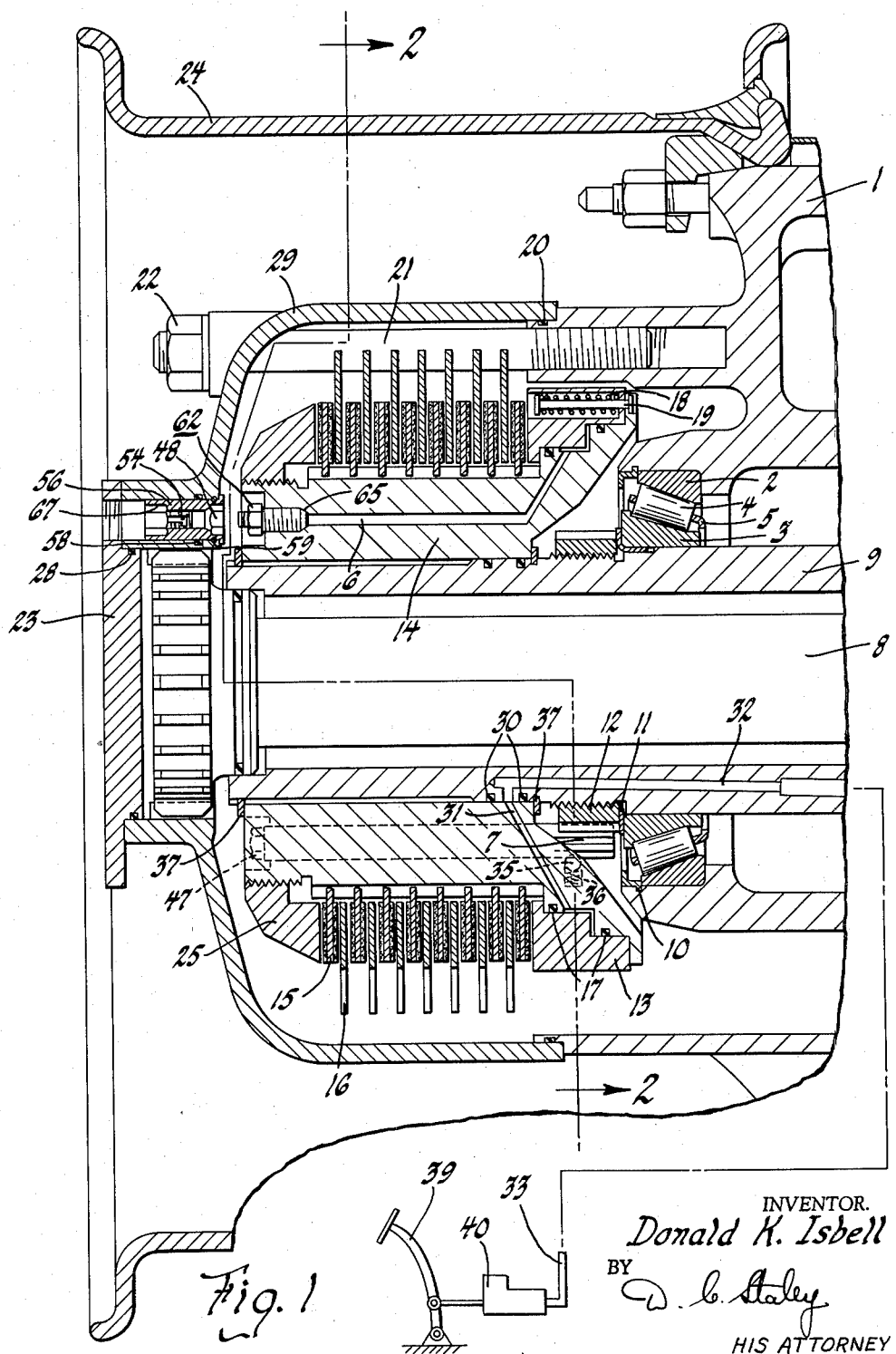
Fig. 1 is a cross-section view of the wheel and bearing assembly as well as the brake assembly. The view is taken from an angle perpendicular to the center line of the wheel shaft.
Figure 2:
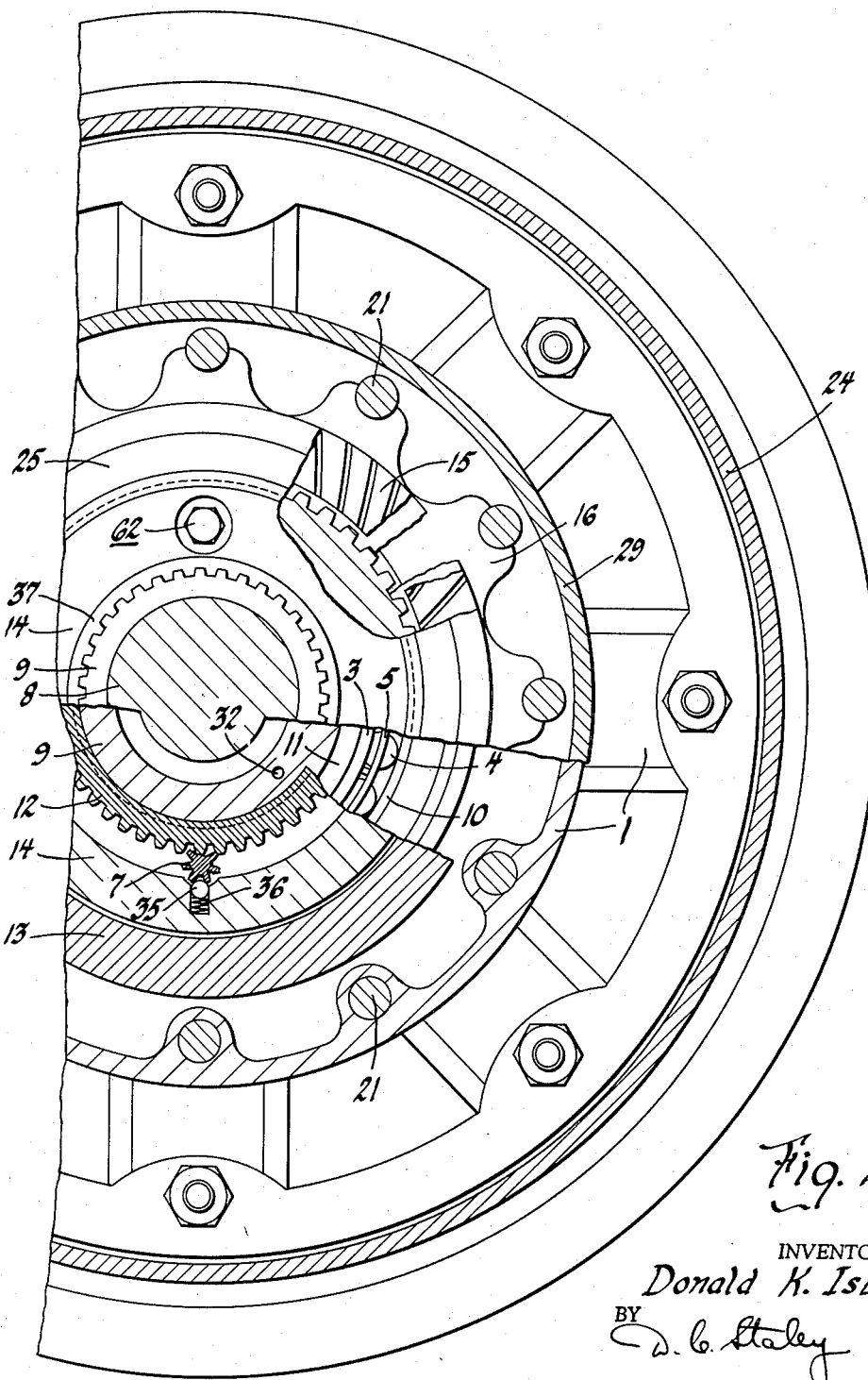
Fig. 2 is a cross-section view as indicated by line 2—2 of Fig. 1.

Fig. 1 illustrates the bearing and wheel assembly and brake assembly. Shaft 8 is mounted within shaft housing 9 and a bearing assembly is mounted about the outer periphery of the shaft housing 9. The bearing assembly comprises an outer race 2 and an inner race 3, a rolling element 4 and a cage 5. A wheel 1 is rotatably mounted on the bearing assembly. At the outboard end of the hub, a snap ring 10 is provided to hold the bearing assembly in position. Seating ring 11 is also provided on the outboard side of the bearing assembly. An adjustable ring gear 12 is threadedly mounted on the shaft housing 9 and, when rotated, provides an adjustment of the bearing assembly. This adjustable ring gear may be rotated by means of a pinion gear member 7 which extends outboard in a line axially parallel to the axis of shaft 8. This bearing adjusting pinion gear 7 is spaced radially outward from the shaft 8. The outboard end of the bearing adjusting pinion gear is provided with a hexagonal head.

The brake assembly is mounted outboard of the wheel and bearing assembly and is also shown in Fig. 1. A stator disk mounting member 14 is spline-connected to the shaft housing 9. Two snap rings 37 are inserted on the shaft housing 9 to prevent axial movement of the stator disk mounting member 14. The stator brake disks 15 are also spline-connected to the outer periphery of the stator disk mounting member 14. An end thrust plate 25 is mounted on the stator disk mounting member 14 and adjacent to the outboard stator disk 15. An annular pressure plate 13 is mounted inboard and adjacent to the inner stator disk 15 on the stator disk mounting member 14. Seals 17 are provided between the annular pressure plate 13 and stator disk mounting member 14.

A space for hydraulic fluid is provided between annular pressure plate 13 and stator disk mounting member 14 for actuating the annular pressure plate in an axial direction. This opening for hydraulic fluid is connected by a passage 31 through the stator disk mounting member 14. Annular seals 30 are also provided between the annular stator disk mounting 14 and the shaft housing 9 where the fluid passage 31 is connected to the fluid passage 32, which is in the shaft housing 9. The fluid for actuation of the hydraulic brake enters through the passage 32 from the hydraulic system. The hydraulic system is the conventional type of foot pedal 39 operating master cylinder 40 with transmission lines 33 leading to the wheel cylinders. Another passage 6 is also provided from the hydraulic cylinder to the bleed screw 62. This passage 6 is provided with a conical seat 65 which fits a beveled cooperating portion 64 on the bleed screw 62.

The annular pressure plate is also provided with a disengaging spring 18 and a cooperating pin 19. Pin 19 is fastened on the inboard portion of the pressure plate thereby providing a force axially inward on the annular pressure plate to release the braking disks.

The rotating brake disks are also mounted for engagement with the stator brake disks. A brake housing 29 encloses the brake assembly and is fastened to the wheel 1 by means of stud bolts 21 and nuts 22. These stud bolts 21 also provide a mounting means for the rotating brake disks 16. A seal 20 is provided on the inboard edge of the brake housing about the inner periphery of the housing 29 and the outer periphery of the hub section of wheel 1. The wheel and the brake housing rotate as a unit. One or two rims 24 may be mounted about the outer periphery of the wheel. The outboard section of the bell-shaped brake housing 29 is also provided with an end plate 23 and a seal 28. The brake housing 29 is also spline-connected to the outboard end of shaft 8.

Fig. 5 shows the combination tool inserted into the sleeve member 56. The sleeve member 56 is shown mounted in the brake housing 29. A seal 58 is shown on the outer periphery of the slidable sleeve 56. A snap ring 59 is also shown mounted about the outer periphery of the slidable sleeve 56. The slidable sleeve is provided with a socket 67 on the outboard end. Adjacent to said socket 67 the internal portion of sleeve 56 is provided with threads. These threads are adapted to receive a threaded member 51. This threaded member is hollow on its axially-outward or rearward end and has a longitudinal slot 54 cutting through the cylindrical portion and connecting another slot at right angles thereby providing a lug 55. The forward end of the threaded member 51 is provided with a valve portion 52. Just rearward of the valve seat 52, a passage 53 is cut radially inward which is in communication with the hollow rearward portion of said threaded member. Within the slidable sleeve 56 just forward of the threaded portion, an annular groove is cut. Just forward of this annular groove is a beveled portion 57 which provides a seat for the valve portion 52 of threaded member 51.

The portion of the sleeve 56 on its inner periphery forward the seat 57 is smooth and cylindrical. On the inner periphery of the sleeve 56 forward of this cylindrical portion a socket 48 is provided. The extreme forward portion of sleeve 56 is flared outward slightly from this socket and the outer portion is flanged to form an annular flange 68. Flange 68 abuts against the housing 29 when the slidable sleeve is in its rearward position. A seal 58 is also provided on the inner periphery of the brake housing 29 and about the outer periphery of sleeve 56. A snap ring 59 is also mounted in a groove just forward of seal 58.

Within the stator disk mounting member 14 a bleeder screw 62 is threadedly mounted. The forward end of the screw 62 is seated in a cone-shaped portion 65 of passage 6. The forward end of screw 62 is also beveled at 64 for cooperation with the cone-shaped portion 65 of the stator disk mounting member 14. Clearance is provided in passage 6 just outward of the cone-shaped portion 65 and around the cylindrical portion 69 of the bleed screw 62 so that when the bleed screw 62 is screwed outward fluid may pass about the forward end of the bleed screw. The intermediate portion of the bleed screw is threaded at 63 where it screws into the stator disk mounting member 14. The rearward portion of the bleed screw has a cylindrical portion 61 with a seal 60 mounted in a slot in this portion of the screw 62. Just forward of this cylindrical portion 61 of screw 62 is a hexagonal head portion. As a slidable sleeve 56 is moved forward, the cylindrical portion 61 and seal 60 are received in the smooth cylinder portion of the sleeve to form a fluid seal. The hexagonal head of screw 62 is received in the forward socket of sleeve 56. The forward end of sleeve 56 and flange 68 are received within a cylindrical portion surrounding screw 62 and within the stator disk mounting member 14. The flanged portion 68 abuts against the forward wall of this cylindrical opening in the stator disk mounting members 14.

The combination tool which inserts within the slidable sleeve 56 is shown in Fig. 4. Hollow cylinder 41 is shown with a fitting 43 for a hose 38. Hose 38 is shown attached in Fig. 5. Fig. 4 also shows the groove portion about the outer periphery of cylinder 41 on its rearward portion just forward of the raised portion 43. The hollow cylinder 41 is provided with a lug 49 on its extreme forward end for operating the threaded member 51. The lug is mounted on a portion of the cylinder 41 with the greater portion of the cylinder diametrically opposite the lug being cut away. An opening in the hollow cylinder is shown at 50 for draining fluid. A second cylinder 44 is mounted around cylinder 41. The rearward portion of cylinder 44 is provided with a handle as shown at 45. The rearward portion of cylinder 41 is also provided with a handle shown at 42. The forward end of cylinder 44 is provided with a seal 46. A head 47 is also mounted on the extreme forward end of cylinder 44. The head 47 is received in socket 67 of the slidable sleeve 56 when the combination tool is inserted in the slidable sleeve.

Figure 3:
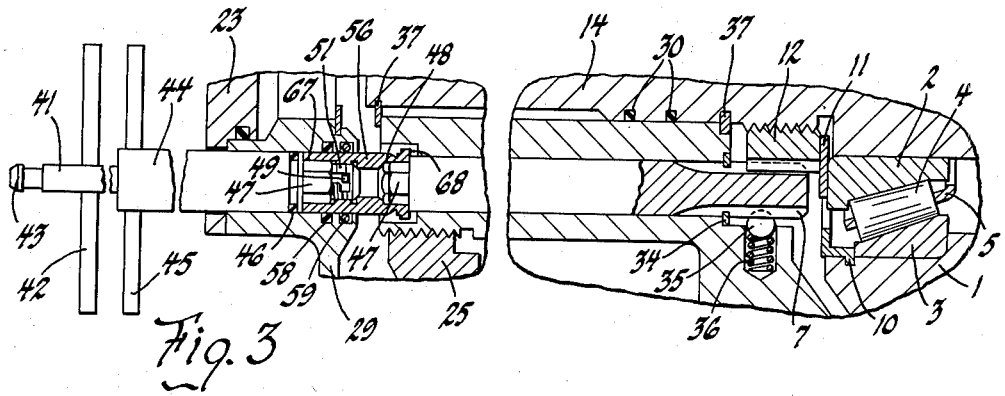
Fig. 3 is a cross-section view of the combination tool in operation with the bearing adjustment member. This view is taken from the same direction as view 1.

Fig. 3 shows the slidable sleeve and the combination tool inserted therein with the socket on the forward end of the slidable sleeve receiving a hex head portion of the bearing adjustment pinion gear 7. The forward end of the bearing adjustment pinion gear is mounted with a snap ring 34 on its inner portion. A friction detent 35 is mounted radially outward from the geared portion of the pinion. This detent 35 is pressed against the pinion portion by means of spring 36. Upon rotation of the pinion gear, the bearing adjustment ring gear 12 is rotated to the desired position and the detent 35 then locks the gear from further movement.

The operation of the combination tool is as follows: When it is desired to bleed off impurities, such as air, from the hydraulic system, the combination tool is inserted in the slidable sleeve 56. The head 47 of the combination tool is received within the socket 67 of the slidable sleeve. Upon forward movement of the slidable sleeve 56 and the proper alignment of the slidable sleeve with the bleed screw which is accomplished by rotating of the brake housing 29, the forward socket of the slidable sleeve receives the hex head of the bleed screw 62. The inner cylinder 41 then is moved forward within the cylinder 44. The lug 49 is received within the threaded member 51, which is mounted within the slidable sleeve 56. As the cylinder 44 is rotated by means of handle 45, the bleed screw 62 moves outward. This provides an opening of the valve between the beveled portion 65 of passage 6 in the stator disk mounting member 14 and the mating portion 64 of the valve on bleed screw 62. Upon opening this valve, the fluid is allowed to enter around the forward portion of bleed screw 62. The fluid then enters a passage 70 in the forward end of the bleed screw 62. The fluid moves rearward within the passage in the center of the bleed screw until it comes against the forward flat portion of the threaded member 51. At this point the fluid is controlled so that it does not escape within the housing 29 and also cannot move any further through the combination tool because its passage is blocked by the forward end of threaded member 51. Upon turning the inner cylinder 41 by means of handle 42, the threaded member 51 is rotated and moves rearward within the threads of the slidable sleeve 56. As the threaded member 51 moves rearward, the valve portion 52 of a threaded member 51 moves away from the seat portion 57 of the slidable sleeve 56. This allows fluid to pass around the valve portion 52 into the groove portion just rearward of the seating portion 57 within the inner periphery of slidable sleeve 56. The fluid further continues to pass through the passage 53 to the inner portion of the threaded member 51 and thence rearward through the passage 50 of the inner cylinder 41. The fluid then may be drained to a suitable container through hose 38. When the desired amount of fluid has been bled from the hydraulic cylinder, then the outer cylinder 44 is rotated by means of handle 45. This closes the valve 64 against the seat 65 and blocks any further passage of fluid from passage 6. The inner cylinder 41 is then rotated by means of handle 42 and thereby closes the valve portion 52 of the threaded member 51 against the seat 57 of the slidable sleeve 56. The lug 49 is rotated forward of lug 55 and, upon rearward movement, carries the slidable sleeve to a rearward position. As the slidable sleeve moves into the rearward position, the flange 68 abuts against the brake housing 29. In this position the snap ring 59 drops into a groove on the outer periphery of sleeve 56. The inner cylinder 41 then must be rotated into the groove portion 54 of threaded member 51 so that it no longer engages the lug 55. In this position the combination tool may then be removed from the slidable sleeve.

When a bearing adjustment is desired, the brake housing 29 is rotated to the position where the slidable sleeve 56 is in axial alignment with the center line of the bearing adjustment pinion gear 7. The combination tool then is inserted within the slidable sleeve and head 47 is received within socket 67. The slidable sleeve and the combination tool is then moved forward until the forward socket 48 in the slidable sleeve 56 engages the head on the bearing adjustment pinion gear 7. In this position the outer sleeve 44 is then rotated, which, in turn, rotates the bearing adjustment pinion gear 7. As the bearing adjustment pinion gear is rotated, the bearing adjustment ring gear 12 is also rotated. The bearing adjustment ring gear 12 is rotated until the bearing is tight and then may be counterrotated to the desired tightness within the bearing. The bearing, as disclosed, is a tapered roller bearing and so the axial movement of the inner race 3 provides an adjustment for the bearing assembly. The detent 35, which is spring-mounted, provides a stop for the bearing adjustment pinion gear 7 as well as the bearing adjustment ring gear 12. When the proper adjustment is made on the bearing, the inner cylinder 41 is then rotated so that lug 49 engages lug 55. Upon rearward movement of the combination tool, the slidable sleeve 56 is also carried rearward. When the slidable sleeve is in its rearward position, the flange 68 then engages the brake housing 29. In this position snap ring 59 also locks within a groove of the outer periphery of slidable sleeve 56. The inner cylinder 41 is then rotated so that lug 49 and lug 55 are no longer in engagement and a combination tool may then be retracted from the slidable sleeve 56.

While the embodiments of the present invention as herein disclosed constitute a preferred form, it is to be understood that other forms might be adopted.

What is claimed is as follows:

1. A device for bleeding a brake and adjusting a bearing comprising in combination; a hollow cylinder, a handle on the rearward portion relative to the operator when said device is in the operating position and a non-cylindrical head extending axially forward from said cylinder, a second hollow cylinder mounted concentrically within and arranged for axial and rotative movement relative to said first cylinder, a handle on the rearward portion and a lug extending outward from the forward portion of said second cylinder, a brake assembly including, a slidable sleeve, a brake housing to carry said slidable sleeve, a forward socket and a rearward socket in said sleeve, an internally-threaded center portion in said sleeve, a threaded valve member mounted within said internally-threaded center portion of said sleeve, means in said valve for receiving said lug of said secondary cylinder for transmitting controlling movement to said valve in response to manual movement of said second cylinder, said rearward socket of said sleeve adapted for receiving a mating head of said first cylinder, said forward socket of said sleeve adapted for selectively receiving for rotating a head of a bearing adjusting member and a head of a bleeder screw.

2. A brake bleeding and bearing adjusting device for operation in combination with, a brake assembly, a wheel and bearing assembly mounted on a single shaft means and connected to said brake assembly, a sleeve, a brake housing enclosing said brake assembly and providing a mounting for said sleeve, a socket in the inboard end of said sleeve adapted for selectively and rotatively engaging a bleed screw or bearing adjusting pinion, a valve within said sleeve, a bleed screw with a socket head and means for receiving a seal member on its outboard end mounted in said brake assembly adapted for engaging said socket in the inboard end of said sleeve, said seal providing a sealing means between the outer periphery of said screw and the inner periphery of said sleeve, means for adjusting the bearing including, a bearing adjusting pinion mounted in said brake assembly with a head adapted for reception in said socket in the inboard end of said sleeve, a socket on the outboard end of said sleeve, a tool including a first hollow cylinder having a head for reception in said socket in the outboard end of said sleeve, a handle on the outboard portion of said cylinder, a second hollow cylinder mounted within said first cylinder adapted for axial and rotative movement relative to said first cylinder, a lug on the inboard end of said second cylinder, means in said valve for receiving said lug to provide movement of said valve in response to manual movement of said second hollow cylinder, a handle on the outboard end of said second cylinder, a fitting on the outboard end of said second cylinder for attaching a hose for conducting a fluid from said second cylinder and thereby provide a bleeding means of said brake assembly.

3. A brake tool comprising in combination; a first cylinder, handles mounted on the rearward end of said first cylinder, relative to the operator of said brake tool, a lug mounted on the forward end of said first cylinder, a second cylinder mounted concentrically around said first cylinder, handles mounted on the rearward portion of said second cylinder, a head mounted on the forward end of said second cylinder, a brake assembly including a slidable sleeve with a socket on the outboard end for receiving said head of said second cylinder, a brake housing supporting said slidable sleeve, a valve threadedly mounted within said sleeve and slotted to engage said lug on the forward end of said first cylinder, a socket portion on the inboard end of said slidable sleeve adapted to selectively receive for rotating of a self-sealing bleeder screw head or a head of a bearing adjustment member.

4. A brake tool comprising in combination; a hollow cylinder, handles on said cylinder, a lug on the forward end of said cylinder relative to the operator of said brake tool, a second hollow cylinder receiving said first cylinder, handles on said second cylinder, a head on the forward end of said second cylinder, a hydraulic brake assembly including, a slidable sleeve having a threaded inner portion, a socket on the outboard portion of said slidable sleeve for receiving said head of said second cylinder, a brake housing supporting said slidable sleeve, a seal within the housing on the outer periphery of said sleeve, a snap ring within said housing adapted to limit the slidable sleeve in the outboard position, a valve threadedly mounted within said slidable sleeve with a slot for receiving a lug on said first cylinder, a socket on the forward end of said slidable sleeve adapted for selectively receiving the head on a bleeder screw and head of a bearing adjusting gear and thereby provide means for adjusting a bearing and bleeding said brake.

5. A tool comprising in combination; a cylinder, a hollow second cylinder mounted within said first cylinder, means for rotating said first cylinder, means for rotating said second cylinder, a lug on the forward end of said second cylinder, a head on the forward end of said first cylinder, a seal about the outer periphery of the first cylinder, a hydraulic brake including, a slidable sleeve, a socket in said slidable sleeve on its outboard end for receiving the head on the said first cylinder, a brake housing supporting said slidable sleeve, a valve mounted within said slidable sleeve, a slotted portion within said valve for receiving the lug of said second cylinder to provide means for rotating said valve as well as axial movement of said valve, a socket in the forward end of said slidable sleeve adapted to selectively receive a head of a bleeder screw or a head of a bearing adjusting member.

6. A brake with bleeder means comprising in combination; a shaft, a shaft housing enclosing said shaft, a bearing assembly mounted on said shaft housing, a wheel rotatably mounted on said bearing assembly, a brake assembly mounted on said shaft housing adjacent said bearing assembly, a hydraulic cylinder within said brake assembly, a bleeder screw mounted on the outboard side of said brake assembly radially outward from said shaft, passage means connecting said hydraulic cylinder to said bleeder screw, passage means within said bleeder screw and a valve portion on the forward end of said bleeder screw, means for adjusting said bearing including, a rotatable bearing-adjusting member in said brake assembly extending from said bearing assembly to the outboard side of said brake assembly, said bearing-adjusting member being on the same radial circle as said bleeder screw, a brake housing connected to said wheel and said shaft, a slidable sleeve in said brake housing mounted on the same radial circle as said bleeder screw and bearing adjusting member, a valve member threadedly mounted within said slidable sleeve, a socket in both ends of said slidable sleeve, the inner one of said sockets being for selectively and rotatively engaging said bleeder screw or bearing-adjusting member, a bleeding tool comprising two concentric hollow cylinders, means for providing rotative and axial movement of each cylinder individually, a lug on the forward end of said inner cylinder for engaging means on said valve in the slidable sleeve to control the valve, a male head on the forward end of said outer cylinder for fitting and engaging the outboard socket of said slidable sleeve and to thereby provide a means for bleeding said brake assembly or adjusting said bearing assembly.

7. A brake having bleeding means comprising in combination; a bearing and wheel assembly mounted on a single shaft means, a hydraulic brake assembly adjacent said wheel and bearing assembly, a bleeding passage within said brake assembly, a bleeder screw in said brake assembly for controlling fluid within said bleeder passage and disposed radially outward from the center of said brake assembly, passage means within said bleeder screw, means for adjusting said bearing including, a bearing-adjusting member mounted in said brake assembly extending to a point adjacent to said bearing assembly on the same radial circle as said bleeder screw, a brake housing enclosing said brake assembly, a slidable sleeve mounted in said brake housing on the same radial circle as said bleeder screw and said bearing adjusting member, a valve member mounted within said slidable sleeve, an inboard socket and an outboard socket in said slidable sleeve, said inboard socket for selectively and rotatively engaging the bleeder screw or the bearing adjusting member, an adjusting tool including two concentric hollow cylinders, means for providing rotative and axial movement of each cylinder individually, a lug on the inboard end of said inner cylinder for engaging said valve member, a head on the inboard end of said outer cylinder for engaging the outboard socket of said slidable sleeve thereby controlling the bleeding of said brake or the adjusting of said bearing member.

8. A brake having a bleeder means comprising in combination; a wheel and bearing assembly mounted on a single shaft means, a hydraulic brake assembly, passage means for bleeding said hydraulic brake, a bleeder screw mounted outboard in said brake assembly having passage means within said screw connected to said passage means for bleeding said brake, a valve portion on the inboard end of said bleeder screw for controlling the fluid within said bleeder passage, means for adjusting said bearing including, a bearing-adjusting member mounted in said brake assembly and extending to the outboard side of said brake assembly, said bleeder screw and said bearing-adjusting member mounted on the same radial circle about said shaft means in said brake assembly, a brake housing in said brake assembly, a rotatable and slidable sleeve mounted in said brake housing on the same radial circle as said bleeder screw and brake-adjusting member, a socket on the inboard end of said slidable sleeve for selectively and rotatively engaging said bleeder screw or said bearing-adjusting member, a valve threadedly mounted within said slidable sleeve, a groove and lug on said valve member, a socket outboard of said valve member in said slidable sleeve, a combination tool including two concentric cylinders one mounted within the other, means for providing rotative movement and axial movement of said cylinders individually, a lug on the forward end of the inner concentric cylinder for engaging the groove and lug of said valve within said slidable sleeve, a head on the forward end of the outer concentric cylinder for engaging the outboard socket of said slidable sleeve and thereby providing a means for bleeding said brake assembly or adjusting said bearing member.

9. A brake assembly having bleeder means comprising in combination; a wheel and bearing assembly mounted on a single shaft means, a hydraulic brake assembly mounted adjacent said bearing assembly, means for adjusting said bearing assembly including, a bearing-adjusting member mounted in said brake assembly and extending to said bearing assembly, a bleeder screw for bleeding said brake assembly mounted on a common radial circle about said shaft means with said bearing adjusting member in said brake assembly, a brake housing for enclosing said brake assembly, a slidable sleeve mounted in said brake housing and having a socket on its inboard end, means for selectively engaging and rotating said bleeder screw and said bearing-adjusting member, said sleeve having a socket on its outboard end, a valve in said slidable sleeve, a tool comprising two concentric hollow cylinders one mounted within the other, means for providing rotative and axial movement of said cylinders individually, a lug on the inboard end of the inner cylinder, means for receiving said lug in said valve, to provide valve controlling movement in response to manual movement of said inner cylinder, a head on the inboard end of the outer cylinder for reception in said outboard socket of said slidable sleeve and selectively controlling the bleeding of said hydraulic brake or the adjustment of said bearing member.

References Cited in the file of this patent

UNITED STATES PATENTS

| | | |
|---|---|---|
| 1,677,473 | Gast | July 17, 1928 |
| 2,274,213 | Pratt et al. | Feb. 24, 1942 |
| 2,644,548 | Schiemann | July 7, 1953 |
| 2,645,314 | Lackinger | July 14, 1953 |
| 2,704,233 | Schjolin et al. | Mar. 15, 1955 |
| 2,771,093 | Wilson | Nov. 20, 1956 |